United States Patent
Hellerud

(10) Patent No.: US 10,252,581 B2
(45) Date of Patent: Apr. 9, 2019

(54) DEVICE FOR DETECTING WEAR OF A TIRE

(71) Applicant: Fyster AS, Oslo (NO)

(72) Inventor: Wiggo R. Hellerud, Langhus (NO)

(73) Assignee: Fyster AS, Oslo (NO)

( * ) Notice: Subject to any disclaimer, the term of this patent is extended or adjusted under 35 U.S.C. 154(b) by 592 days.

(21) Appl. No.: 14/895,000

(22) PCT Filed: Jun. 14, 2013

(86) PCT No.: PCT/EP2013/062389
§ 371 (c)(1),
(2) Date: Dec. 1, 2015

(87) PCT Pub. No.: WO2014/198334
PCT Pub. Date: Dec. 18, 2014

(65) Prior Publication Data
US 2016/0114632 A1 Apr. 28, 2016

(51) Int. Cl.
*B60C 11/24* (2006.01)
*B62D 61/00* (2006.01)

(52) U.S. Cl.
CPC .......... *B60C 11/243* (2013.01); *B60C 11/246* (2013.01); *B62D 61/00* (2013.01)

(58) Field of Classification Search
None
See application file for complete search history.

(56) References Cited

U.S. PATENT DOCUMENTS

| | | | |
|---|---|---|---|
| 7,654,136 B2 * | 2/2010 | Liao | B60C 23/0408 73/146.8 |
| 2005/0007239 A1 | 1/2005 | Woodard et al. | |
| 2006/0244616 A1 * | 11/2006 | Hill | G01M 3/045 340/604 |
| 2017/0368890 A1 * | 12/2017 | Rodriguez Vazquez | B60C 11/246 |

FOREIGN PATENT DOCUMENTS

| | | | |
|---|---|---|---|
| CN | 101807291 | | 1/2010 |
| CN | 102890104 A | * | 1/2013 |
| EP | 0441659 A | | 8/1991 |
| JP | 61150804 | | 7/1986 |
| WO | WO02/20287 A | | 3/2002 |
| WO | WO2006/098840 A | | 9/2006 |

OTHER PUBLICATIONS

Machine Translation: CN-102890104-A; Chen Shutian; (Year: 2018).*
Office Action dated Feb. 8, 2017 from Japanese Patent Office.
Office Action and search report dated Nov. 2, 2016 from Chinese Patent Office.

* cited by examiner

*Primary Examiner* — Andre J Allen
(74) *Attorney, Agent, or Firm* — Christian D. Abel

(57) ABSTRACT

Device (10) for detecting and indicating wear of a tire (15), where the device (10) comprises at least one moisture detector (30) located in a tread of the tire.

8 Claims, 1 Drawing Sheet

# DEVICE FOR DETECTING WEAR OF A TIRE

The invention relates to wear indicating arrangement for tires. More specifically, the invention relates to a device located in a tire where the device comprises a moisture detector.

BACKGROUND

During use a tire is worn in the tread area which is a part of a tire that normally has a groove pattern which is in contact with the road. The tread is specifically designed to provide traction for stopping, starting, cornering and provide long lasting wear.

Wear of a tire take place over the time it is used due to friction forces working between the tire and a road surface. The friction force will also result in wear on the road surface. In the winter time, when studded tires are often used, the road surface will be especially exposed to wearing due to studs tearing up the road surface.

Worn tires will result in increased breaking distance. This is especially the case in wet weather. Without sufficient tread in a tire, aquaplaning may occur when a layer of water builds between the tire and the road surface, thus leading to a loss of traction that prevents the vehicle from responding to control inputs. This may have severe consequences.

Tires should be removed from service and replaced when they reach a certain tread depth, which is the distance from the tread surface to the bottom of the main grooves.

If worn tires are not replaced in time accidents are more likely to happen due to skidding on bald or nearly bald tires. Also, excessively worn tires are more susceptible to damage from road hazards.

Prior known methods for determining wear on a tire are visual inspection, estimation based on time used etc.

A combination of estimating the time a tire is used and visual inspection is the most common way of checking if a tire should be replaced.

When performing a visual inspection, the tread depth is measured and the tire is inspected for scratches etc.

Some tires have tread wear indicators that are located at the base of the main grooves and that are equally spaced around the tire. Built-in tread wear indicators look like narrow strips of smooth rubber across the tread that will appear on the tire when a certain point of wear is reached.

It is well known that tires are not frequently inspected and that accidents occur due to poor quality of tires.

In addition to manual inspection, there are devices for automatically detecting the wear state of a tire. Known devices for indicating wear of a tire are complex and expensive and typically comprise devices arranged in the wheel between the tire and the rim. They normally require powered electronics with sufficient power to transmit the state of the tire wear. Powering by using cables is not a good option due to rotation of the wheel. The same applies to the use of batteries since these will require inspection and maintenance since the voltage will drop over time.

EP-2368724 A1 describes a tire wear detection device comprising a piezoelectric element and a transmitter that are included in the rim of a tire. Signals from the wear detector are combined with signals from a pressure sensor unit indicating internal air pressure of the tire. The pressure sensor is arranged in the wheel. The signals from the piezoelectric element and the pressure sensor are received in a receiver unit arranged on a vehicle body.

JP-3875349 B2 describes a transmitter in a vehicle transmitting a signal to a passive transponder, typically an antenna, in the tread of a tire. When the tire is worn, the transponder is destroyed, i.e. worn off, and a response signal is not sent back. This solution does not require powered electronics in the wheel, but does require a transceiver installed in the vehicle.

Known solutions for automatically detecting wear of a tire are based on complex devices installed in the wheel and/or in the vehicle the wheel in mounted to.

There is a need for a simple and inexpensive way of automatically detecting and indicating tire wear and also the degree of wear independent of any transmitter or receiver installed in the vehicle the wheel is mounted to. It is also a need for a self-powered solution for indicating tire wear and allowing a tire to be used over several years without having to check the state of batteries powering a transmitter.

In it simplest embodiment, the present invention is based on a device detecting moisture for indicating wear of a tire.

In one embodiment the solution is totally independent by a self-powered and self-driven communication solution based on a catalytic electrode accumulator which is located below the wear surface in the tread area of a tire. When the tire has been worn to a certain degree, water will at some point penetrate and activate the accumulator that will start generating power to a transmitter, thus indicating that the tire has been worn to a certain degree.

The detecting device can be inactive in several years without any degrading of the functionality.

SUMMARY OF THE INVENTION

An object of the present invention is to provide a simple and inexpensive way of automatically detecting and indicating tire wear and also the degree of wear independent of any transmitter or receiver installed in the vehicle the wheel is mounted to. Another object is to provide a self-powered and self-driven solution for indicating tire wear and allowing a tire to be used over several years without having to check the state of batteries powering a transmitter.

In one aspect of the invention, this is achieved by a device for detecting and indicating wear of a tire, where the device comprises at least one moisture detector located in a tread of the tire mounted on a wheel.

Further features of the invention are defined in the dependent claims. Other aspects and advantages of the present invention will become apparent from the following description, taken in conjunction with the accompanying drawings, illustrating by way of examples the principles of the invention.

DETAILED DESCRIPTION OF THE INVENTION

The invention will now be explained in detail with reference to the drawing, where:

As mentioned, the object of the present invention is to provide a device 10 for detecting and indicating wear of a tire 15. Detecting wear of a tire is provided by a device 10 comprising at least one moisture detector 30 located in a tread of the tire 15. When a moisture detector 30 is placed in a tread area of a tire 15 and below a wear surface, moisture will not be detected before a certain amount of wear surface has been worn down. In one embodiment, the wear surface can be rubber from the tire itself or it can be a wear surface made in a different material. The wear surface can also comprise several stacked wear surfaces, e.g. rubber from the tire 15 itself and below that another wear surface made in another material.

Each wear surface may thus comprise different thicknesses and/or materials such that each surface has a different time span to be worn down during use.

In order to be able to detect not only wear but also degree of wear of a tire 15, several stacked wear surfaces can be located in the tread area of the tire 15, and where moisture detectors are located below each wear surface.

Figure 1:
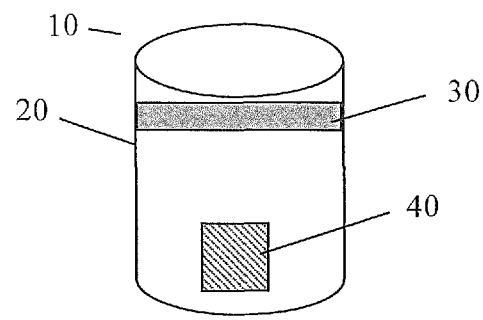
FIG. 1 shows a device for detecting tire wear according to the invention.

FIG. 1 shows one embodiment of the invention. In this embodiment, the device 10 comprises the moisture detector 30 as well as other means, all of which are located in a cavity 20 in the tread area of a tire. More specifically this embodiment of the device 10 comprises said moisture detector 30 as well as signal transmitting means both connected to means for generating energy which will be further described below. The signal transmitting means comprising a transmitter 40 will transmit a signal indicating wear of the tire when moisture is detected. The cavity 20 can be a hole drilled, milled or pre-moulded in the tread area of the tire 15.

The cavity 20 can also be a housing holding the different parts of the device 10. The housing is inserted in the tread area of the tire 15. The outside of the housing can be fitted with barbs such that when the housing is mounted in the cavity 20 of the tire it will stick. As mentioned, the wear surface can for instance be rubber from the tire itself or it can be a wear surface made in a different material, both of which are located above the cavity 20 or housing as in the last example.

The means for generating energy can be a small battery connected to the moisture detector and the transmitter 40 which will start transmitting a signal when moisture is detected.

In one embodiment of the invention the means for generating energy comprises at least one dry charged catalytic electrode accumulator having a double function when also acting as the moisture detector 30 when moisture and water penetrate through a worn wear surface.

When moisture and water reach the accumulator it will be activated and will start generating energy and provide the necessary power to the transmitter 40 for transmitting a signal indicating wear of the tire.

This type of battery can stay inactive and without degrading over several year. Since it is dry charged, it will not deliver power until it is activated by moisture and water due to wear of a tire.

The accumulator can for instance be made of a copper electrode and a zinc electrode with dry salt between them as an electrolyte. This is one example of several possible electrodes and electrolytes. Other known combinations with other metals may be more effective and produce higher voltage curves than copper and zinc.

Separate accumulator cells can also be connected in series and with different combinations of electrodes for generating a desired voltage.

Electrodes of copper and zinc output a voltage of about 1 volt, but by connecting these in series the voltage can be increased.

When water enters between the electrodes, due to wear of the wear surface of the housing, the electrolyte will be activated and power will be produced. The accumulator will thus act as a moisture detector and a power supply. It will indirectly also act as a wear sensor due to the wear surface.

The signal transmitting means can be standard known means comprising a radio transmitter 40 with corresponding electronics. In its simplest embodiment the information sent from the signal transmitting means can be a carrier wave with a set frequency and possibly as a pulsed signal. In a system comprising several tires, the identification of the device will also be added to the carrier wave.

The wear surface above the moisture detector should be made in a material and with a thickness that is adjusted to kind of use of the tire, and that will give the desired time delay before the wear surface is worn down. For tires comprising the inventive device 10 and that are mounted on heavy duty vehicles, the wear surface should be thicker and made of a material that is more resistant to wear that for lighter vehicles like private cars.

In one embodiment of the invention the device 10 further comprises a unique electronic identification such that it is possible to differentiate between different devices 10 comprised in corresponding tires on a vehicle. A wear signal is then sent together with an identification of the device.

When using an accumulator it is placed in waterproof housing, i.e. the cavity 20 where the device 10 is placed is a waterproof housing. This will be waterproof until the wear surface is worn down due to friction forces exerted from the road on the wear surface. The degree of wear of a tire will thus be detected and indicated since the device 10 is located in the tread of the tire and will be worn simultaneously as the tread of the tire is worn.

The degree of wear of a tire will thus be reflected by the degree of wear of the wear surface of the device 10.

How fast a wear surface of the device 10 is worn will depend on construction material used and where in the tread area the device 10 is located.

In order to receive the signals sent from the transmitter 40 in the device 10, a receiver must be used. Type of receiver used can be one mounted in the vehicle where the tires are mounted or it can be a portable receiver. The only requirement is that the receiver is able to receive the signals transmitted from the transmitter.

In one embodiment the transmitter is a Bluetooth sender and the receiver is a Bluetooth receiver. The Bluetooth receiver can for instance be a mobile phone controlled by a dedicated application running on it.

When mounting new tires 15 on a vehicle, each with the inventive device 10 installed, the ID of each device 10 can be registered in said application as well as where on the vehicle each device 10 is installed. The registration can be automated by using for known techniques, for instance bar codes, RFID etc.

Other feasible options for receiving signals from the inventive device 10, for detecting and indicating wear of a tire, is for instance by using a receiver installed in a fixed location like a garage or service station.

One example of such an installation is at a petrol station where a receiver is installed nearby a petrol pump. An indication of a worn tire 15 can then be given if a vehicle parked next to the pump and with the device 10 installed has a worn tire.

Figure 2:
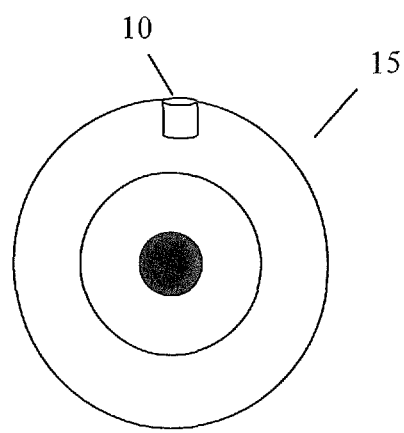
FIG. 2 shows a tire comprising a device according to the invention.

FIG. 2 shows a tire 15 comprising a device 10 according to the invention and where this is located in the tread area of the tire 15. The tread area of a tire 15 is the area of a tire 15 in contact with the ground and thus the area of a tire 15 which is exposed to frictional forces wearing a tire. The location where the device 10 is placed in the tire 15 is critical since it is the interplay between the wear surface of the tire 15 and location of the device 10 relative to the wear surface that will determine the accuracy of detection of moisture and thus the degree of wear of a tire.

The wear surface of the device 10 has preferably the same shape as the surface of the tread of the tire 15 it is mounted in and the device 10 is placed a few millimeters below the tread of the tire 15.

Figure 3:
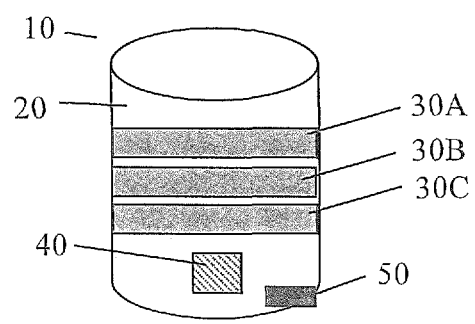
FIG. 3 shows a device for detecting tire wear, and where the device comprises several stacked wear surfaces in the tread area of the tire, and where moisture detectors are located below each wear surface.

FIG. 3 shows a device 10 for detecting tire wear, and where the device 10 comprises several stacked wear surfaces in the tread area of the tire 15, and where moisture detectors 30A, 30B and 30C are located below each wear surface. This configuration of the device 10 can differentiate between several degrees of wear.

In one embodiment, the moisture detectors 30A, 30B and 30C are three stacked accumulators also acting as moisture detectors located below respective wear surfaces. When this solution is implemented in a tire 15, it can transmit wear data several times reflecting the different degrees of wear of the tire.

The figures show the accumulators in a sandwich construction. In another embodiment, the accumulators can be in a series configuration where the wear surface of each accumulator is made with different materials such that the degree of wear will differ.

The first or top located accumulator 30A will, with a certain degree of wear and thus penetration of moisture, generate power with a certain voltage given by the type of electrodes used, if there are several cells connected in series etc.

As the degree of wear increase, the second accumulator will be activated, and at last the third and last accumulator will be activated.

To be able to identify the different accumulators 30A, 30B and 30C in order to know which accumulator that is transmitting, the number of cells in each accumulator 30A, 30B and 30C can be different such that generated voltage from each accumulator is different.

Examples of generation of different voltages are:

Accumulator 30A comprises two cells which typically gives a voltage of 1,8V. Accumulator 30B comprises three cells which typically gives a voltage of 2,7V. Accumulator 30C comprises four cells which typically gives a voltage of 3,6V.

If it is desirable to detect even more degrees of wear, the number of accumulators can be increased. The configuration of the device 10 can for instance comprise a combination of stacked wear surfaces and wear surfaces connected in series, all with moisture detector below each wear surface.

In one embodiment of the invention the device 10 further comprises one or more additional sensors 50 for detecting other physical parameters than moisture.

The invention is further defined by a tire 15 comprising a device 10 for detecting and indicating wear of a tire 15, where the device 10 comprises at least one moisture detector 30 located in a tread of the tire 15. All of said embodiments of the device mentioned above can be comprised in the tire 15.

Rerubbering for the purpose of retreading a tire 15 is often performed on heavy duty tires 15 used for trucks, tips and other vehicles exposed to mayor wear of tires. When performing rerubbering of a tire 15, the inventive device 10 can be placed in the worn tread area of prior to performing the rerubbering.

The invention is further defined by a vehicle 10 with at least two tires 15 where at least one tire comprises a device 10 for detecting and indicating wear of a tire 15, where the device 10 comprises at least one moisture detector 30 located in a tread of the tire 15.

The present invention provides a flexible and inexpensive way of detecting and indicating wear of a tire 15.

The invention claimed is:

1. A device for detecting and indicating wear of a tire, where the device-comprises:
   at least one moisture detector comprising at least one dry charged catalytic electrode accumulator operating as an energy generator, and which is located below a wear surface in a tread area of the tire; and
   a transmitter (40) connected to the electrode accumulator for transmitting signals indicating wear of the tire (15).

2. The device according to claim 1, further comprising an identification of the device.

3. The device according to claim 1 or 2, further comprising several stacked wear surfaces in the tread area of the tire, and where the at least one moisture detectors is located below each wear surface.

4. The device according to claim 3, where each wear surface comprises different thickness and/or materials such that each surface has a different time span to be worn down during use.

5. The device according to claim 1, where the energy generator is at least two dry charged catalytic electrode accumulators that are located below the at least one wear surface in the tread area of the tire, each comprising different types of catalytic accumulators for generating different voltages.

6. The device according to claim 1, further comprising one or more additional sensors for detecting other physical parameters than moisture.

7. The device according to claim 6, where the additional sensor is a temperature sensor.

8. The device according to claim 1, where the device is enclosed in a housing.

* * * * *